United States Patent [19]

Junier

[11] Patent Number: 5,029,608

[45] Date of Patent: Jul. 9, 1991

[54] DIVERTER VALVE

[75] Inventor: Marius R. Junier, Houston, Tex.

[73] Assignee: Triten Corporation, Houston, Tex.

[21] Appl. No.: 535,187

[22] Filed: Jun. 8, 1990

[51] Int. Cl.[5] .................................................. F16K 3/00
[52] U.S. Cl. ...................................... 137/375; 137/874
[58] Field of Search .......................... 137/375, 872, 874

[56] References Cited

U.S. PATENT DOCUMENTS

| 3,132,669 | 5/1964 | Feldsted | 137/874 X |
|---|---|---|---|
| 3,592,221 | 7/1971 | Worley | 137/375 |
| 3,701,359 | 10/1972 | Worley et al. | 137/375 |
| 3,726,306 | 4/1973 | Purvis | 137/375 |
| 3,771,561 | 11/1973 | Santamaria, Jr. | 137/872 |
| 3,964,507 | 6/1976 | Jandrasi et al. | 137/375 |
| 3,976,094 | 8/1976 | Jandrasi et al. | 137/375 |
| 4,220,270 | 9/1980 | Szadhowski | 137/874 X |

Primary Examiner—John C. Fox
Attorney, Agent, or Firm—Vaden, Eickenroht, Thompson & Boulware

[57] ABSTRACT

There is disclosed a diverter valve having a gate for closing one or the other side-by-side seats aligned with outlets from a valve body wherein the body is made of carbon steel or other relatively low heat resistant but inexpensive metal, and the seats and other internal parts are made of stainless steel or low heat resistant metal.

3 Claims, 3 Drawing Sheets

DIVERTER VALVE

This invention relates generally to a diverter valve, and, more particularly, to improvements in a diverter valve of the type for use in controlling the flow of high temperature fluids through a valve body by means of a gate adapted to be guidably moved across the faces of side-by-side seats on the inner ends of outlets from the valve body in order to selectively open one while closing the other.

In a prior valve of this type manufactured by the assignee of the present application, and especially well suited for use in refineries or other environments in which such fluids are present, the valve body and its internal parts including seats, gate, and guides for maintaining the gate over one or the other of the seats are made of stainless steel which is resistant to such high temperatures. Although stainless steel is advantageous from this latter standpoint, it is quite expensive, and its use in the fabrication of the valve substantially increases the cost of the overall valve as compared, for example, to a valve of comparable size having its body and internal parts fabricated of a less expensive metal such as carbon steel. Also, there are other instances in which other metals such as carbon steel is more desirable, as, for example, in controlling polythionic acid to which stainless steel is susceptible to attack.

Although the body of such a valve made from carbon steel could be protected from the hot fluid by lining it with suitable insulation, this is not possible in the case of the seats, gate and other internal parts which must be made of stainless steel or other, relatively expensive, highly heat-resistant metal since their heat cannot be dissipated to the environment about the valve. However, different metals, such as stainless and carbon steels, have substantially different coefficients of thermal expansion and contraction, which would require that the valve body and seats, gate and guide parts mounted on the valve body be free to move axially and radially with respect to one another when in use. Still further relative movement would be encountered between the seats themselves as one seat is covered by the gate, and thus shielded from the hot fluid, while the other is uncovered and thus exposed thereto.

The object of this invention is to provide a diverter valve of this type which is less expensive than the prior valve in that it is of such construction as to enable the body to be made of carbon steel or other less expensive metal despite the relative expansion and contraction of the body and internal parts with respect to one another.

This and other objects are accomplished, in accordance with the preferred and illustrated embodiment of the invention by a valve of this type wherein the body is made of a metal such as carbon steel having relatively low resistance to heat, but having its inner surface lined with a heat insulating material, and the seats are so mounted on the body that they may expand and contract radially as well as axially with respect thereto as well as with respect to one another. More particularly, the gate has guide means thereon which is guidably movable with respect to guide means on each of the seats whereby despite such relative expansion and contraction, the gate is maintained over one or the other of the faces of the seats to close it when the gate is moved between its alternative positions. Thus, only the seats and other internal parts must be made of stainless steel or other relatively expensive heat resistant material to thereby substantially reduce the cost of the valve.

As illustrated, the gate is guided with respect to each of the seats by tongues on each of its sides guidably movable within grooves on the seats, with the grooves being sufficiently wider than the tongues and flared at their oppositely facing ends so as to permit the tongues to move from one groove to the other despite relative expansion and contraction of the seats. Also, the first and second outlets on the valve body comprise conduits on one side thereof, and each of the seats is mounted on a conduit by means of a frusto-conically shaped member connected at its large end to the inside of the conduit and its small end to the seat close to its orifice, thus maintaining the seats close to the side of the valve body in which the conduits are formed.

In the drawings, wherein like reference characters are used to indicate like parts:

Figure 1:
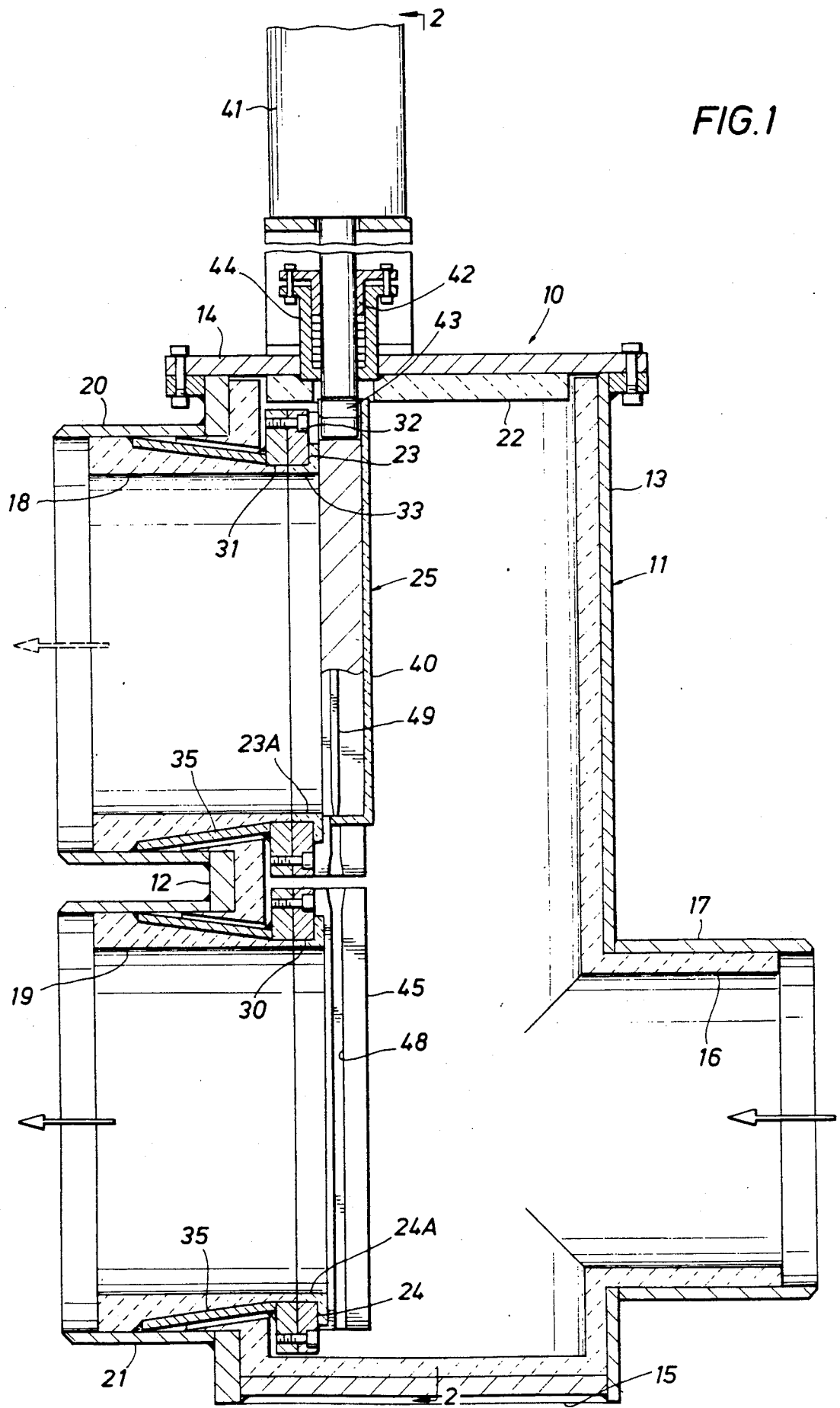
FIG. 1 is a longitudinal sectional view of a valve constructed in accordance with the preferred embodiment of the invention, with the gate over one seat to divert flow from the inlet into the orifice in the other seat and thus through the outlet on which its mounted.
Figure 2:
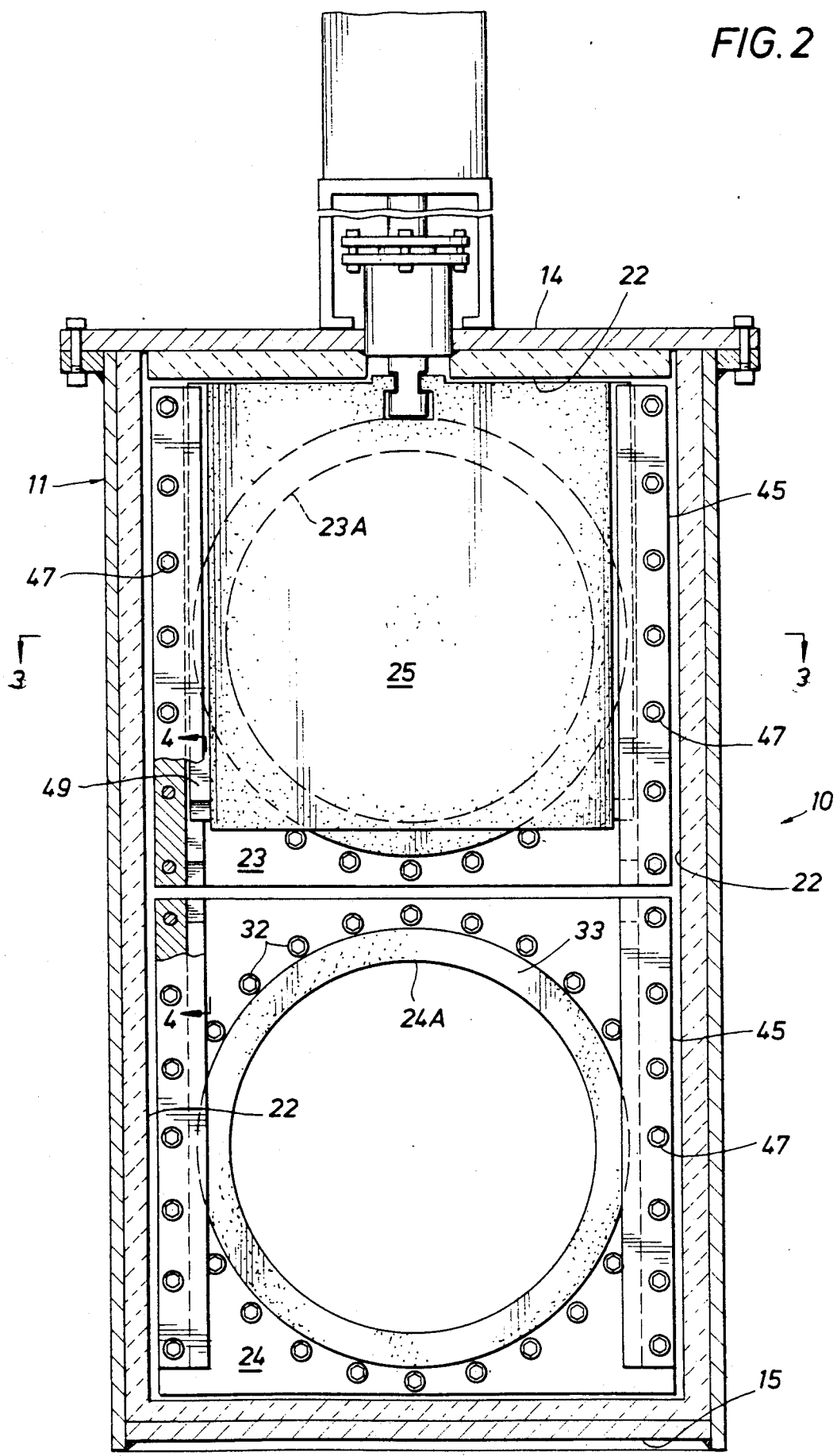
FIG. 2 is another longitudinal sectional view of the valve of FIG. 1, as seen along broken lines 2—2 of FIG. 1.
Figure 3:
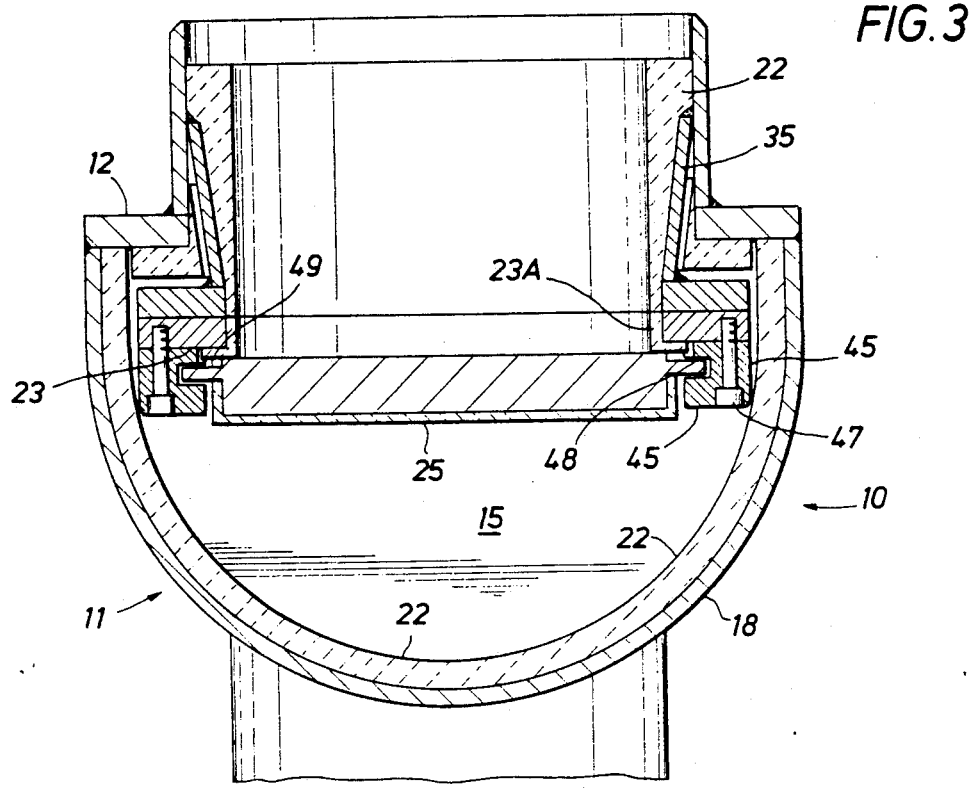
FIG. 3 is a cross-sectional view of the valve, as seen along broken lines 3—3 of FIG. 2.

The overall valve, which is indicated in each of FIGS. 1, 2 and 3 by reference character 10, comprises a valve body 11 having a flat side 12 and a curved side 13 whose opposite ends are joined to the ends of the flat side 12, as best shown in FIG. 3. The body also includes opposite ends 14 and 15 suitably bolted or welded to the ends of the sides, as shown. Normally, the valve is disposed on its side with the curved side 13 being uppermost.

An inlet 16 to the valve body is formed within a conduit 17 connected to and extending outwardly from side wall 11, and a pair of outlets 18 and 19 from the body formed respectively within the conduits 20 and 21 connected to and extending outwardly from side-by-side openings in the sidewall 12 of the body. As previously described, the walls of the valve body, including the conduits 17, 20 and 21, are made of a metal such as carbon steel having relatively low heat resistance. As also previously described, the inner surfaces of the valve body are covered by an insulating material 22 which protects the relatively low heat resistant metal from the extreme temperatures of the fluids to be controlled.

As previously mentioned, the valve is particularly well suited for use in a refinery or other environments in which high temperature fluids are to be controlled, and in which flow from the inlet is to be diverted through one or the other of the outlets. For this purpose, a first seat 23 is mounted on the valve body with its orifice 23A in alignment with the outlet 18 and a second seat 24 is mounted on the valve body with its orifice 24A in alignment with the outlet 19. When so mounted, the seats are disposed in side-by-side relation and with their inner seating faces in coplanar relation, whereby a gate 25 may be moved within the body between alternate positions closing one of the outlets and opening the other.

Thus, as shown in FIGS. 1, 2 and 3, the gate is disposed over the face of the seat 23 and across the orifice of the seat to close the outlet 18. Upon downward movement from the position shown in FIG. 1, the gate opens the orifice through the seat 23 and moves over the seat 24 and across the orifice therethrough to close the outlet 19. Each seat ring includes an orifice plate 30 having an orifice formed therein and a seat plate 31 having an orifice connected to one another by bolts 32 with the orifices aligned. The inner corner of the inner face of each orifice in each orifice plate is covered by a ring 33 of abrasion resistant material, and the gate 25 is provided with a covering 40 of an abrasion resistant material on its inner side opposite the side engaging the face of the seats.

As previously described, each of the seats is mounted on the valve body by means of a frusto-conically shaped member 35 whose smaller end is connected to the seat plate 31 near its orifice and whose larger end is connected to the inner diameter of the conduit generally intermediate the inner and outer ends of the conduit. More particularly, the ends of the members 35 are welded to the conduits and seat plates so as to permit some flexibility between them and thus, as previously described, permit the seat rings to expand and contract axially as well as radially with respect to the valve body as well as with respect to one another. Although other means may be provided for mounting the seats on the valve body, the frusto-conically shaped members 35 are especially well suited for this purpose, particularly since their connections to the conduits and the seats enables the seats to be disposed close to the adjacent wall of the valve body, thus maintaining the inside lateral dimensions of the valve body at a minimum.

The gate is moved between its alternate positions by means of an operator 41 of any suitable construction and having a reciprocal stem 42 received through a packing 44 mounted on the end 14 of the valve body and connected to the upper end of the gate by a T-slot 43. This connection of the stem of the operator to the gate provides some degree of lateral movement of the gate with respect to the seats which is useful in maintaining the face of the gate against the face of the seat to be closed, as will be best understood from the description to follow.

Figure 4:
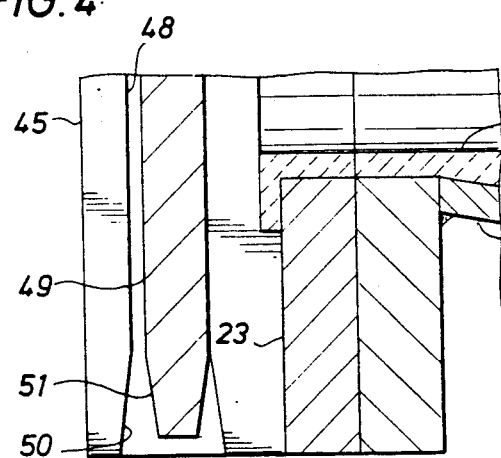
FIG. 4 is an enlarged detailed sectional view of a portion of the valve, as seen along broken lines 4—4 of FIG. 2, showing the tongue on one side of the gate disposed within a groove on one side of the seat closed by the gate.
Figure 5:
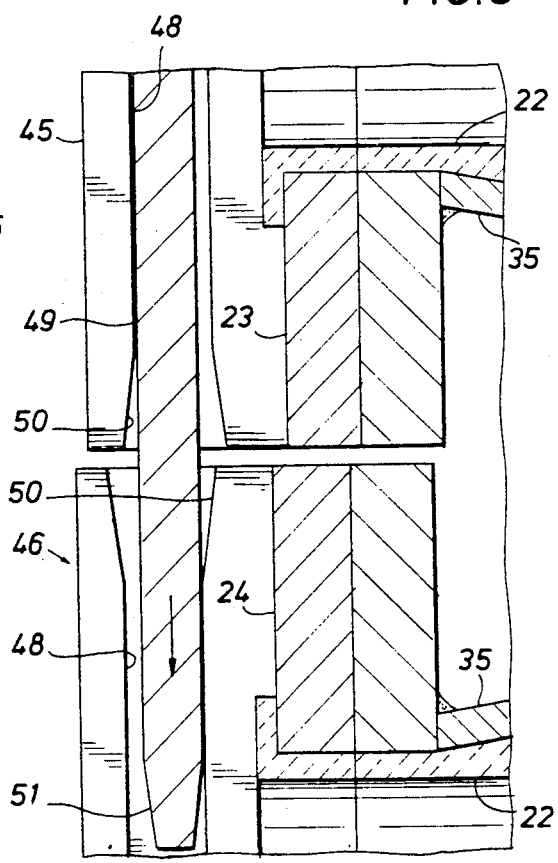
FIG. 5 is a view similar to FIG. 4, but showing the tongue as it moves into a groove on the adjacent side of the other seat as the gate moves to its alternate position.

The gate is guided in its movement between its alternate positions by guide means on opposite sides of the gate guidably movable with respect to guide means on opposite sides of the seats. Thus, as best shown in FIGS. 2 and 3, guide plates 45 are secured to the opposite sides of the orifice plate of each seat by means of bolts 47. More particularly, a longitudinal slot 48 is formed in each guide plate to receive a tongue 49 which extends outwardly from each side of the gate. As best shown in FIGS. 4 and 5, each groove 48 is substantially wider than the tongue 49 adapted to move within it and is flared at 50 at its end adjacent the opposite end of the other groove. Preferably, the ends of the tongues are also tapered inwardly at 51.

As shown in FIG. 4, when there is little or no relative expansion and contraction of the seats with respect to the valve body as well as with respect to one another, the grooves are aligned with one another, and the lower side of the tongue is engaged with the opposite face of the groove 49 in the seat 23, being held in this position both by its weight and the force of fluid pressure within the valve body. When the high temperature fluids in the valve body cause the seats to expand and contract with respect to the valve body as well as with respect to one another, one seat moves axially as well as radially with respect to the other. As shown in FIG. 5, despite this relative movement, the tongues on the gate are free to move from within the groove in the guide for one seat into the groove in the guide for the other seat as the gate moves between its alternate positions. This of course is made possible by the greater width of the grooves than the width of the tongues, as well as the flares 50 on the ends of the adjacent grooves and the tapered ends on the tongue.

As previously described, this novel construction of the valve 10 requires that only the internal parts, including the seats, gate, mounting means, and guide means be made of stainless steel or other relatively expensive, high heat resistant material. Although the carbon steel or other relatively inexpensive metal of which the valve body is formed must be lined with a heat insulating material, this added cost is relatively small compared to the cost which would be encountered if the entire valve were made of the high heat resistant material.

The heat resistant material may of course be fabricated and installed on the inner surfaces of the valve body in any suitable manner. As shown, it includes shapes which conform to the inner and outer sides of the frusto-conically shaped mounting members 35. In any case, the heat resistant material lines the inner surfaces of the valve so as to protect it against the heat, leaving only the seats and other internal parts which must be of a high heat resistant material.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A diverter valve, comprising
an outer body having an inlet thereto and first and second outlets therefrom arranged in side-by-side relation,
heat insulating material lining the inner surface of the body,
first and second seats each having an orifice therein,
means mounting the first seat on the body with its orifice in alignment with the first outlet and for radial and axial expansion and contraction with respect thereto,
means mounting the second seat on the body with its orifice in alignment with the second outlet for radial and axial expansion and contraction with respect thereto as well as with respect to the first seat, a gate movable within the body between a first position across the first seat orifice to close the first outlet and open the second outlet and a second position across the second seat orifice to close the second outlet and open the first outlet, first guide means on the first seat, second guide means on the second seat, guide means on the gate guidably movable with respect to the guide means on the first and second seats so as to maintain the face of the gate closely adjacent the opposite faces of the seats as the gate is moved between its first and second position, and means for so moving the gate between its opened and closed positions, said body being made of a metal having lesser heat resistance and a different thermal coefficient of thermal expansion and contraction than the metal of which the seats, mounting means, gate and guide means are made.

2. A diverter valve of the character defined in claim 1, wherein the guide means on each seat includes longitudinal grooves on each side thereof, and the guide means on the gate includes longitudinal tongues on each side thereof guidably movable within the grooves, the grooves being substantially wider than the tongues so as to permit the tongues to pass from one groove to the other despite relative expansion and contraction of the seats.

3. A diverter valve of the character defined in claim 1, wherein the first and second outlets from the body comprise first and second conduits, respectively, extending from one side of the body, and the first seat mounting means comprises a first frusto-conically shaped member connected at its small end to the first seat near its orifice and at its large end to the inside of the first conduit, and the second seat mounting means comprises a second frusto-conically shaped member connected at its small end to the second seat near its orifice and its large end to the inside of the second conduit.

* * * * *